Nov. 15, 1932. H. H. LYNN ET AL 1,888,042
COMPOUND ALLOY PLATE
Filed Dec. 20, 1930 2 Sheets-Sheet 2
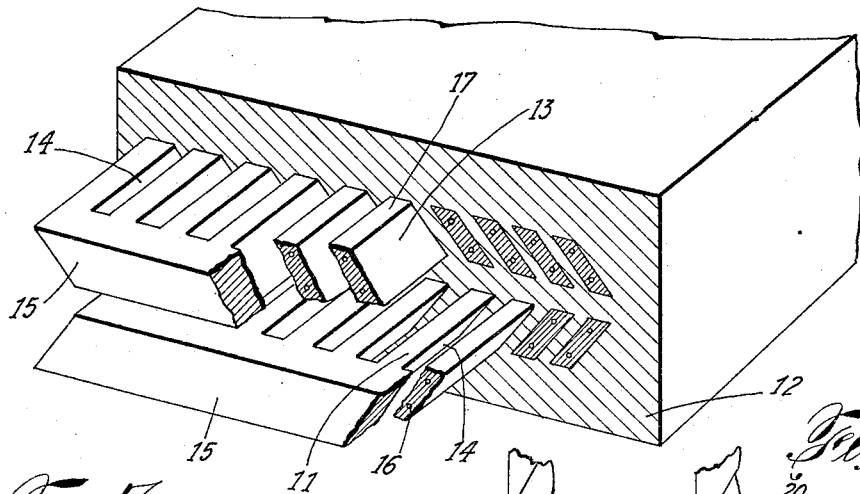
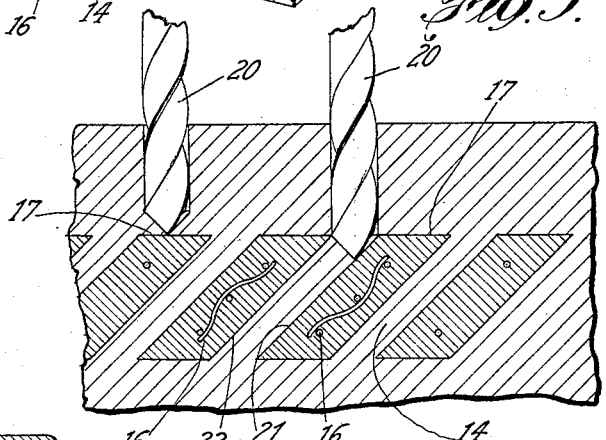
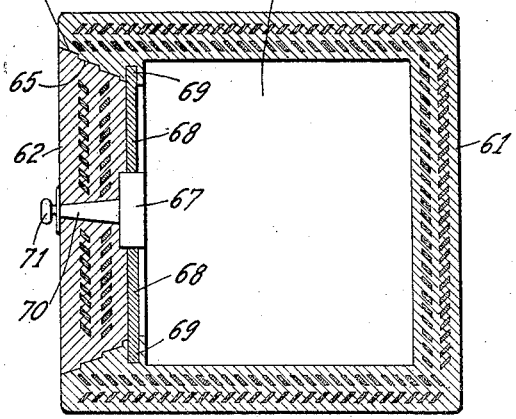
Inventors
Harry Lynn.
Henry L. Coles.
By
Attorney Patented Nov. 15, 1932

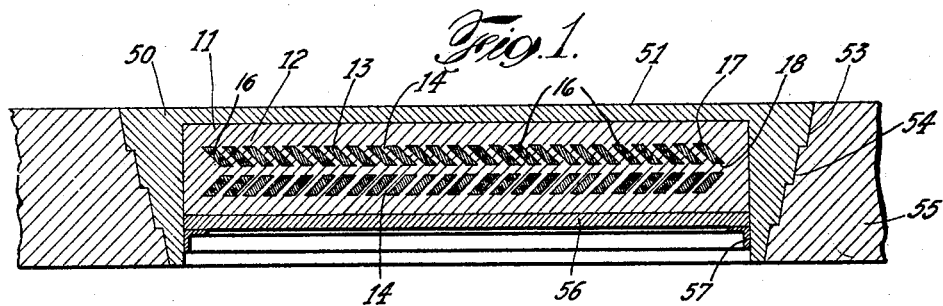
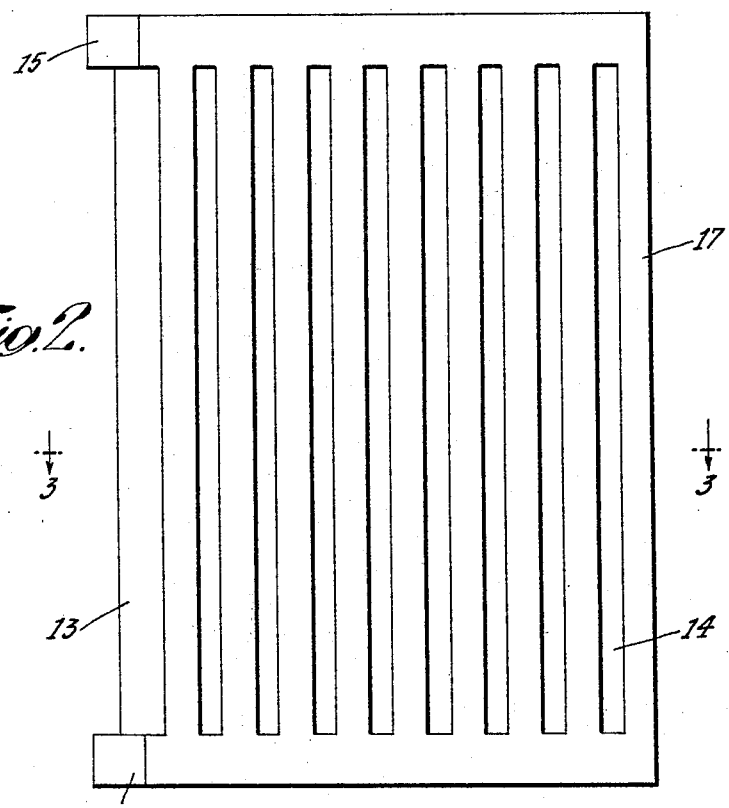
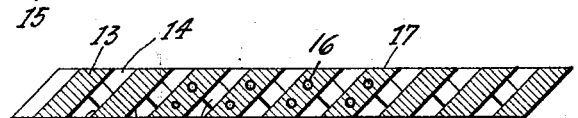

1,888,042

UNITED STATES PATENT OFFICE

HARRY H. LYNN, OF WYOMING, AND HENRY L. COLES, OF HAMILTON, OHIO, ASSIGNORS TO GUARDIAN METALS COMPANY, OF HAMILTON, OHIO, A CORPORATION OF DELAWARE

COMPOUND ALLOY PLATE

Application filed December 20, 1930. Serial No. 503,688.

This invention relates to improvements in composite structural units, and more particularly to improved torch and drill resistant safe and vault members or plates and structure made therefor.

In a prior application, filed by Henry L. Coles (S. N. 234,957, filed November 22, 1927, for composite metals and process for producing the same) there has been disclosed and claimed a novel burglar proof structure, as well as the component parts thereof and the heat and drill resistant alloys entering into the composition. In another application by the said Henry L. Coles (S. N. 446,817 filed April 24, 1930 now Patent No. 1,815,187, issued July 21, 1931) there has been disclosed and claimed a novel safe and vault member comprising spaced and staggered slat members of frangible material cast about a ductile supporting mesh, the said spaced slats being provided with an integral sheath of a highly conductive metal, the whole being particularly adapted to resist burglarious attack by the acetylene torch and other pyrogenic destructive agencies, as well as drills and other mechanical devices.

It is an object of the present invention to provide an improved safe and vault construction comprising members having latticed cores, the members of which are so disposed with respect to each other as to prevent passage therethrough at right angles to the outside face thereof of any of the torch and drill destructive agencies.

It is a further object of this invention to provide in a novel fashion a plurality of angularly disposed slats in a safe or vault wall so as to deflect and break drills and other mechanical destructive tools.

It is also an object of this invention to provide in a product of this nature such an improved construction in which a plurality of angularly disposed slat members are reversely juxtaposed, but still being positioned to deflect and destroy the effectiveness of drills and torches.

A further object of this invention is the provision of improved burglar proof safe and vault construction in which the component members include drill resistant slat members spaced from each other yet so disposed and arranged as to provide a continuous protecting surface.

It is also an object of this invention to provide such a protecting member in which the angularly spaced and disposed slats are provided with ductile supporting inserts, the whole being encased in a sheath of heat resistant material.

These and other desirable objects and advantages of the present invention will be illustrated in the accompanying drawings and described in the specification. A certain preferred embodiment is illustrated by way of example only, for the underlying principles may be applied to other specific mechanical structures, and it is not intended to be limited to the one here shown except as such limitations are clearly disclosed by the appended claims.

In the drawings like numbers refer to similar parts throughout the several views. These views disclose the present preferred forms. In these drawings:

Fig. 1 is a sectional view of a vault door showing the inventive features herein;

Fig. 2 is a front elevation of a novel core member;

Fig. 3 is a vertical section taken on line 3—3 of Fig. 2;

Fig. 4 is an elevation partly in section of a composite member showing reversely juxtaposed slat members;

Fig. 5 is a vertical section through a composite plate showing the drill resisting action of the slat inserts;

Fig. 6 is a cross sectional view of a safe in which the invention is incorporated; and Fig. 7 represents another formation of the slats having the joining points of the surfaces of the slats at right angles instead of at an angle as shown in Fig. 5.

While the invention disclosed herein may be described in detail as incorporated in any one of several articles, it is preferred to describe it in its adaptation to a most satisfactory use, namely in the production of safes, vaults and special door members therefor.

The improved safe and vault members may be made up of a sheath 11 closing in and around a plurality of core members or slats 12. In the construction as shown, the core members comprise a frangible metal of the type set forth in the above noted applications and cast as described in Patent #1,755,913 of April 22, 1930 issued to Henry L. Coles, a nitrogen liberating mold and core wash being used. These core members comprise a plurality of slats 13 angularly disposed with respect to each other and spaced as indicated at 14. The slats are further provided with unitary end members 15 and are preferably cast about ductile wire or rod supports 16 (see Fig. 4) of the type set forth in Patent No. 1,815,187, issued July 21, 1931, above referred to.

Referring more particularly to Figs. 1 and 3, it will be noted that the top and bottom surfaces 17 and 18 of the slats are laterally disposed with respect to each other so as to provide a substantially continuous overlap between succeeding slats. This construction insures the advantage of a continuous drill or heat resistant surface while permitting the association of the core members with a sheath of any desired material. The several slats may be provided with integral studs 19 disposed in the interslat spaces 14 and providing further points of attack resistance, particularly to drills and other like tools.

In Fig. 4, there is disclosed a fragmentary detail of a composite plate structure in which a pair of slat members are reversely juxtaposed and provide a plurality of tortuous passages 14, which preclude the passage of a drill through the assembly. If a drill were so presented to the face of a member as to successfully negotiate any of the interslat spaces 14, it would engage the top 17 of one of the next succeeding slats.

Referring more particularly to Fig. 5 it will be noted that a series of slats of drill and torch resistant materials is embedded in a surrounding sheath metal with the slats placed at such an angle to the exterior of the sheath metal and so grouped with respect to each other as to overlap so that at no point can a line be drawn perpendicular to the exterior surface of the sheath metal and extending through the slab of said sheath metal and contained slats without penetrating one or more of said slats. It will be appreciated that if a multiplicity of such rows of slats be used the direction of inclination of the slats in succeeding layers can be made opposite to that of the slats in the next adjacent layer forming what might be termed a herring-bone pattern, as shown in Fig. 4.

Assuming that a drill, 20, is driven through the soft sheath metal into engagement with the edge 17 of a slat it will not penetrate due to the inherent resistance of the slat metal. If a similar drill passes below the surface of 17 into contact with the slanting surface 21 of a slat, the tip of the drill will be deflected to the left and coming into engagement of the edge 22 of a slat will be jammed between two drill resistant bodies and either snapped, twisted or otherwise rendered impotent.

It will be seen that there are particular advantages in employing slats or strips located as defined herein, i. e., at an angle to the exterior surface of the plate, the main object being to have the strips so positioned within the plate that when a drill or destructive fire reaches the strips, it will hit them at an angle to the surface of the strips as noted above causing the same to be deflected. Thus the full force and effect of the drill or torch is so materially reduced that it becomes ineffective.

With the formation and assembly of the strips as herein described, it will be noted that the amount of resistance of the strips to the drill and torch may be materially reduced but still such strips are properly effective to prevent the puncture of the plate by the drill or torch. A plate composed of the drill and torch resisting material and the proper encasing material may be further made attractive for use by including a ductile member or screen-like structure within the drill and torch resistant members.

The reversibility of the slat members permits a uniform production to be carried out, the several different styles of finish constructions being made from a plurality of these members arrangd in any desired manner. As these members are normally to be made of drill resistant materials cast about a supporting mesh, it is desirable that uniformity of procedure should be developed in order to permit accuracy in the final product. Such members as intimated above, may be placed in a mold in any desired relation, either reversely juxtaposed as above described, or rotated at an angle, and a sheath of heat resisting metal, or other material such as concrete or other suitable plastics, may be encased therearound. In case a metal sheath such as a copper alloy or the like is cast around the cores, the novel process set forth in Patent No. 1,755,913, of April 22, 1930, is preferably made use of. This patented process insures a clean metal-to-metal surface during the course of the casting operation, and thus provides an integral bonding between the metal parts.

While the novel members of the present invention and the structures formed therefrom have been disclosed as comprising essentially a frangible core member supported on a ductile mesh, the latter being encased in a sheath of heat conductive metal such as novel copper alloy, it will of course be appreciated that the cores may be made of ductile metal or the like and encased in a sheath of drill resistant frangible metal. It will also be appreciated that the cores and sheath or both may be made of plastic materials such as concrete or the like, including heat and drill resistant aggregates.

The novel drill and torch resistant structures above described, are, as already intimated, particularly suited for incorporation into safes and vaults, and more particularly the door members thereof. Referring more particularly to Fig. 1 there is shown a composite member, 11, incorporated in a door designated generally by the numeral 50. This member comprises a body portion or casing, 51, of any suitable material such as cast iron, cast steel, or other metals commonly employed in the art. The member 51 comprises the outer casing of the door and is formed at its lateral edges with stepped surfaces, 53, adapted to engage similar surfaces 54 in wall 55 of the safe or vault. The door is hollowed out or formed with a recess adapted to receive one or more of the composite structures hereinabove described. These structures are so configured as to form a snug fit within the door casing and are held in place by retaining plates 56, and angle irons 57 secured to the door casing and to the said retaining plates. These retaining members are secured from the inside of the door so that it is impossible to release them except by destroying the door structure itself.

Referring more particularly to Fig. 6 there is shown a safe construction comprising top, bottom and side walls which are designated generally by the numeral 61 and a door 62. The door may be of any suitable configuration and is fitted into the front wall of the safe in any desired manner. As here shown the door casing 51 is cast integrally with the composite plate 11, which construction permits of desirable economies in the manufacture of small installations. The construction described provides a storage space 63. As already indicated the abutting surfaces of the door and safe, designated 65 and 66 respectively, are also stepped plane surfaces in intimate contact, although any well known door closures may be used. The door may be provided with a suitable lock mechanism 67 which includes bolts 68 engaging suitable recesses 69 in the front wall. The lock mechanism is provided with the usual spindle 70 and dial 71. The door may be provided with the usual hinges, not shown.

In Fig. 7 there is illustrated a new formation of the slats. This form illustrates the simple formation of the slats with the surfaces at right angles to each other at the corners.

Either the form illustrated in Fig. 5 or the form illustrated in Fig. 7 may be employed as desired. In either event it will be understood that there may be two series of the slats positioned as indicated in Fig. 4.

It may also be noted that the disclosure herein allows and permits the modification of the distance between any two slats so that a large size drill which would have strength to even penetrate the outer surrounding material would be of such thickness that it could not pass between the slats even though the proper angle of the slat members to the exterior surface was known.

It will now be seen that there has been provided a new and useful composite plate and safe and vault construction, the plate being adapted for a variety of purposes and more particularly for use in burglar-proof safes and vaults, together with a novel process for fabricating such composite structures in a manner to secure an intimate union between the component parts thereof.

It will also be seen that due to the slanting of the slat members no drill or torch attack can meet with any success due to the deflection of the tool in the case of a drill or like instrument, and due to the deflection of the flame from the torch together with the concomitant dispersion of the heat developed and its absorption by the body of the metal exposed.

Having thus described our invention, what is claimed and desired to be secured by Letters Patent is:

1. As an article of manufacture, an improved composite plate for burglar resisting safes and vaults, including in combination, a plurality of spaced slats having common ends, the said slats being disposed in the same planes and being mutually overlapping, whereby to present substantial continuity of front and rear surfaces, and a sheath of metal therearound.

2. A composite plate of the type described, comprising, in combination, a plurality of slatted drill resistant members therein, a casing of metal for the members, the members being generally parallel with respect to each other and the slats thereof being disposed at angles with the surface of the plate and with the corresponding slats of associated members whereby to deflect inserted drills and torch flames.

In testimony whereof we have hereunto set our hands.

HARRY H. LYNN.
HENRY L. COLES.